(12) United States Patent
Kaifu et al.

(10) Patent No.: US 8,519,083 B2
(45) Date of Patent: Aug. 27, 2013

(54) PROCESS FOR PRODUCING MEK-MODIFIED RESORCIN/FORMALIN RESIN PARALLELLY CARRYING OUT RECOVERY AND REUSE OF SPECIFIED RAW MATERIAL

(75) Inventors: Nobuo Kaifu, Kanagawa (JP); Hiroshi Nakaoka, Kanagawa (JP); Kaoru Abe, Kanagawa (JP)

(73) Assignee: Hodogaya Chemical Co., Ltd., Tokyo (JP)

( * ) Notice: Subject to any disclaimer, the term of this patent is extended or adjusted under 35 U.S.C. 154(b) by 680 days.

(21) Appl. No.: 12/443,489

(22) PCT Filed: Sep. 27, 2007

(86) PCT No.: PCT/JP2007/068887
§ 371 (c)(1),
(2), (4) Date: Mar. 30, 2009

(87) PCT Pub. No.: WO2008/038742
PCT Pub. Date: Apr. 3, 2008

(65) Prior Publication Data
US 2010/0016541 A1 Jan. 21, 2010

(30) Foreign Application Priority Data
Sep. 29, 2006 (JP) ................................. 2006-268189

(51) Int. Cl.
*C08G 6/02* (2006.01)
(52) U.S. Cl.
USPC ............................. 528/227; 528/129; 528/137
(58) Field of Classification Search
USPC ........................... 528/137, 129, 227
See application file for complete search history.

(56) References Cited

U.S. PATENT DOCUMENTS

| 2,565,569 | A | * | 8/1951 | McCants | 549/352 |
| 3,814,713 | A | * | 6/1974 | Tanaka et al. | 524/510 |
| 4,376,854 | A | * | 3/1983 | Yamaguchi et al. | 528/137 |
| 4,876,324 | A | * | 10/1989 | Nakano et al. | 528/142 |
| 6,072,086 | A | * | 6/2000 | James et al. | 568/449 |
| 7,718,752 | B2 | * | 5/2010 | Kaifu et al. | 528/137 |
| 7,834,124 | B2 | * | 11/2010 | Kaifu et al. | 528/155 |
| 2007/0225462 | A1 | * | 9/2007 | Kaifu et al. | 526/313 |
| 2009/0018304 | A1 | * | 1/2009 | Kaifu et al. | 528/127 |

FOREIGN PATENT DOCUMENTS

| EP | 1679325 A1 | * | 7/2006 |
| EP | 1842864 A1 | * | 10/2007 |
| JP | 2006 312731 | | 11/2006 |
| JP | 2006 312733 | | 11/2006 |
| WO | 2005 035611 | | 4/2005 |

* cited by examiner

*Primary Examiner* — James J Seidleck
*Assistant Examiner* — Peter A Salamon
(74) *Attorney, Agent, or Firm* — Oblon, Spivak, McClelland, Maier & Neustadt, L.L.P.

(57) ABSTRACT

The present invention relates to a process for producing an MEK-modified resorcinol-formalin resin, in which recovery and reuse of the specific raw materials (water, calcium chloride, and methyl ethyl ketone (MEK)), and methanol contained in formalin, are carried out in parallel. Using this closed-system recycle production method, a resorcinol-formalin resin aqueous solution can be obtained, wherein the resin aqueous solution has a reaction product concentration of from 30 to 80%, moderate flowability with a pH of 6 to 10, a calcium chloride concentration of 100 ppm or less, a peak area corresponding to a resorcinol monomer of from 3 to 9% to the entire peak area obtained by gel permeation chromatography analysis, and a peak area corresponding to resorcinol pentanuclear or higher nuclear bodies of from 30 to 55% to the entire peak.

6 Claims, 2 Drawing Sheets

PROCESS FOR PRODUCING MEK-MODIFIED RESORCIN/FORMALIN RESIN PARALLELLY CARRYING OUT RECOVERY AND REUSE OF SPECIFIED RAW MATERIAL

CROSS-REFERENCE TO RELATED APPLICATIONS

This application is a National Stage of PCT/JP07/68887 filed Sep. 27, 2007. This application is based upon and claims the benefit of priority from Japanese Patent Application No. 2006-268189 filed Sep. 29, 2006, the entire contents of which are incorporated herein by reference.

BACKGROUND OF THE INVENTION

1. Technical Field

The present invention relates to an improvement of production steps of a methyl ethyl ketone-modified resorcinol-formalin resin (hereinafter referred to as an "MEK-modified resorcinol-formalin resin" for brevity) and a reuse method of specific raw materials (methyl ethyl ketone (hereinafter referred to as "MEK" for brevity), methanol and calcium chloride) used in the production.

More particularly, in the present invention, resorcinol, water, hydrochloric acid and formalin are used in addition to the above raw materials, and the present invention relates to a recovery and reuse method of the above specific raw materials from a waste liquid containing these chemical substances with good efficiency.

2. Background Art

It is reported that in the production steps for an MEK-modified resorcinol-formalin resin by adding given amounts of calcium chloride, water, MEK, resorcinol and hydrochloric acid as raw materials, completely dissolving those, and adding dropwise formalin thereto to conduct a reaction, an MEK-modified resorcinol-formalin resin was produced by separating the solution into an aqueous layer containing calcium chloride and an MEK layer, removing calcium chloride precipitated by azeotropic dehydration of the MEK layer by pressure filtration, and after solvent substitution of water and MEK by distillation, adjusting the pH with an aqueous ammonia (for example, Patent Document 1).

Conventionally, a resorcinol-formalin resin has high curing rate, and is therefore used in adhesives, plywood, laminated woods, surface coating agents and the like. In particular, the resin has excellent adhesion to rubbers or fibers, and is therefore used as an adhesive for tires and an adhesive for rubber hoses.

Methanol is contained as a stabilizer in formalin in an amount of from several % to about 10%, and formalin is used as a condensation agent in producing an MEK-modified resorcinol-formalin resin, and is therefore an essential raw material, However, a waste liquid from each production step contains a large amount of impurities other than methanol as the stabilizer, and recovery of methanol from an aqueous layer separated from an MEK layer after a liquid-liquid heterogeneous reaction by dropwise addition of formalin is an indispensable operation.

Furthermore, it is known that when a slight amount of inorganic salts such as calcium chloride remains in an MEK-modified resorcinol-formalin resin, adhesion to tires, fibers or the like, in which it is used as an adhesive, is deteriorated. Removal method of the calcium chloride is that calcium chloride dissolved in water contained in the MEK layer is precipitated by azeotropic dehydration, and the precipitate is then treated with pressure filtration.

However, the removal method of calcium chloride by pressure filtration is cumbersome and takes time, and the removal effect is not sufficient. Thus, there is room for improvement.

Patent Document 1: WO2005/035611A1

DISCLOSURE OF THE INVENTION

Problems to be Solve by the Invention

Methanol is contained in formalin in an amount of from several % to about 10%. Concentration of methanol contained in a recovery water reused in a process of producing an MEK-modified resorcinol-formalin resin increases with the increase of the number of reuse. Due to an increased concentration of methanol contained in a solution before reaction, there is a possibility that it may give an adverse influence on the aspect of quality such that the proportion of pentanuclear or higher nuclear bodies (multi-nuclear bodies) of a reaction product that is an MEK-modified resorcinol-formalin resin increases.

An object of the present invention is to provide a method for the recovery and reuse of specific raw materials (calcium chloride and MEK) used in a production of an MEK-modified resorcinol-formalin resin and methanol contained in formalin. Another object thereof is to control a calcium chloride concentration in the final product to 100 ppm or less by improving a part of a production step, thereby stabilizing the quality.

Means of Solving the Problems

The present invention relates to a process for producing an MEK-modified resorcinol-formalin resin, which comprises:

adding 20 to 40 parts by mass of resorcinol (A) to 100 parts by mass of a water solvent;

adding 20 to 80 parts by mass of calcium chloride (B) to 100 parts by mass of water;

adding 10 to 100 parts by mass of methyl ethyl ketone (C) (hereinafter referred to as "MEK" for brevity) to 100 parts by mass of resorcinol (A), followed by stirring to form a two phase system which does not contain residual solid content;

adding hydrochloric acid (D) as a catalyst;

adding dropwise 1 to 40% formalin (E) to resorcinol (A) under stirring in such an amount that gives a formaldehyde/resorcinol molar ratio of 0.3 to 0.7, thereby allowing a liquid-liquid heterogeneous reaction to proceed;

allowing to stand to separate into two layers;

adding water to an MEK layer (0) which is a reaction product layer after removing an aqueous layer (0) in an amount of from an equivalent amount to 5 times of the amount of the reaction product to conduct water washing;

allowing to stand to separate into two layers;

removing an aqueous layer (1);

further conducting the water washing operation at least one time to remove an aqueous layer (2), thereby obtaining an MEK layer (2) containing an MEK-modified resorcinol-formalin resin;

adding water in an amount of 2.5 to 5 times by mass to the MEK layer;

adding 1 to 30% aqueous ammonia, followed by distillation;

removing MEK (C) by distillation; and finally obtaining an MEK-modified resorcinol-formalin resin aqueous solution having a reaction product concentration of from 30 to 80%, moderate flowability with a pH of 6 to 10, a calcium chloride concentration of 100 ppm or less, a peak area corresponding to a resorcinol monomer of from 3 to 9% to the entire peak area obtained by gel permeation chromatography analysis, and a peak area corresponding to resorcinol pentanuclear or higher nuclear bodies of from 30 to 55% to the entire peak, wherein recovery and reuse of specific raw materials (calcium chloride and MEK) in the production steps and methanol contained in formalin (E) are carried out in parallel. The numerical value in parenthesis represents the order of treatment.

To produce an MEK-modified resorcinol-formalin resin, the present invention provides the process for producing an MEK-modified resorcinol-formalin resin, wherein the recover and reuse of methanol is carried out in parallel by obtaining methanol contained in formalin from the aqueous layer (0), the aqueous layer (1), the aqueous layer (2) and the MEK (2) by reduced pressure-distillation, followed by rectification.

To produce an MEK-modified resorcinol-formalin resin, the present invention provides the process for producing an MEK-modified resorcinol-formalin resin, wherein the reuse as the specific raw material (calcium chloride) at the time of reaction initiation is carried out in parallel by removing methanol from an aqueous layer (0) in the production steps by reduced-pressure distillation, and then controlling a concentration of calcium chloride contained in the aqueous layer to a concentration at the time of reaction initiation.

To produce an MEK-modified resorcinol-formalin resin, the present invention provides the process for producing an MEK-modified resorcinol-formalin resin, wherein the recovery and reuse of the specific raw material (MEK) is carried out in parallel by obtaining MEK from the MEK layer (2), the aqueous layer (1) and the aqueous layer (2) in the production steps by simple distillation, followed by rectification.

MEK is used not only for ketone modification of a resorcinol-formalin resin, but also as a liquid-liquid heterogeneous reaction solvent, and has an function of controlling a molecular weight distribution of the objective resin by utilizing a difference in solubility. Furthermore, MEK is utilized as an extraction solvent of the MEK-modified resorcinol-formalin resin.

Concerning the recovery method of MEK, MEK can be separated and recovered mainly from the MEK layer (2) in the production steps by simple distillation, followed by rectification. Furthermore, a high purity MEK can be recovered by rectifying a water-containing MEK solution obtained by removing methanol and the like from the aqueous layer (1) and the aqueous layer (2), which are separated from an MEK layer, by reduced-pressure distillation.

In the MEK-modified resorcinol-formalin resin finally obtained, a molecular weight MW of a component having methyl ethyl ketone incorporated into the molecule is $MW = 110 \times k + 72 \times l + 30 \times m - 18 \times n$ (k, l, m and n each represent an integer). In the equation, 110 is the molecular weight of resorcinol, k is the number of resorcinol unit, 72 is the molecular weight of methyl ethyl ketone, l is the number of methyl ethyl ketone unit, 30 is the molecular weight of formaldehyde, m is the number of formaldehyde unit, 18 is the molecular weight of water, and n is the number of water unit. The relationships of those numerical values are as follows: $k+l+m \approx n+\alpha$, wherein $2 \leq k$, $1 \leq l$, $0 \leq m$, and $\alpha=1$ or 2. The component having methyl ethyl ketone incorporated into the molecule is obtained as a peak having a holding time longer than that of pentanuclear or higher nuclear bodies of a component which does not contain methyl ethyl ketone in the molecule, by a liquid chromatography analysis, and therefore can be recognized by the liquid chromatography analysis. In the present invention, resorcinol n-nuclear bodies means to include both n-nuclear body of a resorcinol-formalin resin itself and a ketone-modified resorcinol-formalin resin having a molecular weight slightly higher than that of a resorcinol-formalin resin itself by ketone modification. The molecular weights of the respective n-nuclear bodies are discriminated based on the peak of gel permeation chromatograph of a resorcinol-formalin resin itself.

In the present invention, the concentration of calcium chloride contained in the final resin product has been greatly reduced by partially improving the production steps. The analysis results comparing the concentration of calcium chloride contained in an MEK-modified resorcinol-formalin resin before improvement (Comparative Example 2) and the concentration of calcium chloride contained in an MEK-modified resorcinol-formalin resin after improvement (Example 2) are shown in Table 1.

TABLE 1

| Sample No. | Treatment method | Number of water washing | Calcium chloride concentration in resin (ppm) |
|---|---|---|---|
| 1 | MEK filtration method | — | 550 |
| 2-0 | MEK water washing method | 0 | 10,000 |
| 2-1 | MEK water washing method | 1 | 280 |
| 2-2 | MEK water washing method | 2 | 30 |

As shown in Table 1, the effect of reducing the calcium chloride concentration in an MEK-modified resorcinol-formalin resin by the change of treatment method in the production steps and the number of water washing treatment is considerably large.

The analysis method employed is shown below.

The calcium amounts in the MEK-modified resorcinol-formalin resins were quantitatively determined by low-temperature ashing/acid decomposition-ICP method.

Advantageous Effects of the Invention

As a result of investigating a recovery method of methanol, methanol can be recovered with good efficiency by allowing a reaction solution to stand to separate the same into an MEK layer and an aqueous layer, taking out the aqueous layer (0), adding aqueous ammonia or the like thereto to adjust the pH to 6 to 10, followed by a distillation method. Furthermore, methanol is contained also in the aqueous layer (1) and the aqueous layer (2) after water washing, and the MEK layer (2). Methanol can be obtained by rectification of these, mainly fractions in the initial stage of distillation thereof. Methanol recovered by this method can be used for a washing solvent of facilities, fuels or the like. By the removal of methanol, it has become possible to reuse an aqueous layer containing calcium chloride.

Calcium chloride can be recovered from an aqueous layer from which methanol has been removed by a distillation method, by reduced pressure or azeotropic dehydration or the like. However, other than this recovery method, reuse by the above-described recycling method is possible. Specifically, the concentration of calcium chloride in a solution before reaction is 39 mass %, and the concentration is decreased to 36 mass % after reaction. Taking this into account, a so-called closed system recycle can be used, in which calcium chloride corresponding the amount of the decreased concentration is post-added, or water is removed by simple distillation to adjust the calcium chloride concentration of the solution to 39 mass %, and the solution is returned to the system before reaction.

MEK can be separated and recovered by subjecting mainly the MEK layer (2) separated from an aqueous layer in the production steps to simple distillation, followed by rectification. Besides, MEK can be recovered by subjecting the separated aqueous layer to simple distillation, and rectifying its initial fraction.

High purity MEK recovered is all returned as a part of the raw materials to the reaction system, and can be reused.

According to the currently existing method, in a step of producing an MEK-modified resorcinol-formalin resin, after completion of the reaction, the reaction liquid is allowed to stand to separate the same into an MEK layer and an aqueous layer containing calcium chloride, etc. To remove calcium chloride dissolved in a slight amount of water contained in the MEK layer, the MEK layer was subjected to azeotropic dehydration, and the precipitated calcium chloride is removed by pressure filtration. However, this method is cumbersome and takes time, and additionally the removal effect is not sufficient. For this reason, by changing the steps into a method of water washing the MEK layer (conducting at least two times), it becomes possible that the calcium concentration in an MEK-modified resorcinol-formalin resin as a final product is surely decreased to 100 ppm or lower, and as a result, a product having stable quality including adhesion can be produced. This has led to complete the present invention.

BEST MODE FOR CARRYING OUT THE INVENTION

Figure 1:
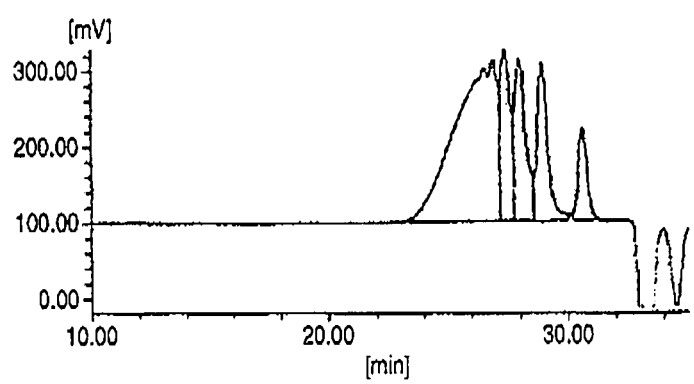
FIG. 1 is a gel permeation chromatograph chart of the MEK resorcinol-formalin resin aqueous solution obtained in Example 2.

The aqueous layer (0) of the above production steps contains large amounts of calcium chloride, methanol, hydrochloric acid and the like as raw materials, and is therefore a waste liquid having high acidity. In the present invention, as distillation conditions for adjusting a calcium chloride in the liquid, it is necessary to neutralize hydrochloric acid with ammonia or the like to suppress influence of hydrochloric acid. Concerning the degree of liquidity of the aqueous layer (0) to be subjected to distillation, the pH is adjusted with aqueous ammonia so as to be from 4 to 10, preferably from 6 to 9, and then water and methanol are distilled away by reduced pressure-distillation. The methanol water distilled away is used for washing an apparatus, etc.

Calcium chloride can be reused by the above-described recycling method from the aqueous layer (0) from which methanol has been removed by distillation. In other words, it has become possible to use a so-called closed system recycle use of calcium chloride in which the concentration of calcium chloride of the reaction system is adjusted to 39 mass % at the time of reuse, and such calcium chloride is returned to the system before reaction.

The aqueous layer (1) through one water washing contains MEK, methanol and a small amount of calcium chloride, and by rectifying fractions from which an initial fraction has been removed, high purity MEK can be obtained. The initial fraction removed mainly contains MEK and methanol, and by rectifying this, separation and recovery can be effected.

The aqueous layer (2) contains MEK and methanol, and pH adjustment with aqueous ammonia is not necessary. By directly subjecting the aqueous layer (2) to reduced pressure-distillation and rectifying fractions from which initial fraction has been removed, MEK and methanol can be separated and recovered. The aqueous layer after recovery of methanol can be discarded as it is.

Concerning MEK, simple distillation is carried out mainly at the stage of water solvent substitution of the MEK layer (2) in the production steps. Because of water contained therein, MEK can be separated and recovered by further rectification. Besides, recovery can be carried out by distilling the separated aqueous layer (1) and aqueous layer (2), followed by rectification. High purity MEK recovered can be all returned as a part of raw materials to the reaction system and reused. Liquid temperature may be an azeotropic temperature or lower of MEK-water, and a distillation apparatus may be a distillation apparatus which does not have a packed tower. Concerning the rectification apparatus, separation can be effected with a general apparatus (theoretical plate number: about 5 to 10).

By improving the production steps for an MEK-modified resorcinol-formalin resin, the calcium chloride concentration in the MEK-modified resorcinol-formalin resin that is a final product can surely be reduced to 100 ppm pr less, and this has made possible to produce a product having stable qualities including adhesion.

In other words, the present invention enables separation/recovery and reuse of the specific raw materials (calcium chloride and MEK) used and methanol contained in formalin, and this also results in reduction of raw material cost. Furthermore, by partially improving the production steps, the calcium chloride concentration in the product that is MEK-modified resorcinol-formalin resin can be reduced to 100 ppm or less, thereby producing a product having stable qualities. Therefore, the advantage of the present invention is considerably large.

The present invention is described in detail by reference to the following Examples.

EXAMPLE 1

270 kg of water, 170 kg of calcium chloride and 74 kg of resorcinol were placed in a 500-liter acid-resistant reaction tank, and were dissolved at 50° C. 30 kg of MEK and 0.9 kg of 35% hydrochloric acid were then placed in the reaction tank. While maintaining the reaction system at 50° C., 33 kg of 37% formalin was added dropwise over 30 minutes. After completion of the dropwise addition, stirring was conducted for 30 minutes to allow a liquid-liquid heterogeneous reaction to proceed. While maintaining the temperature of the reaction system, the resulting reaction mixture was allowed to stand to separate the same into two layers, and the aqueous layer (0) was taken out. 100 kg of water was added to the MEK layer (0) to sufficiently wash with water. The resulting mixture was allowed to stand to separate into two layers, and the aqueous layer (1) was taken out. This water washing operation was further conducted at least one time to remove the aqueous layer (2), thereby obtaining an MEK solution containing an MEK-modified resorcinol-formalin resin in the MEK layer (2).

EXAMPLE 2

The MEK solution of a resorcinol-formalin resin obtained in Example 1 was again placed in the reaction tank. 80 kg of water was added, and 0.6 kg of 28% ammonia water was added. Distillation was conducted at an azeotropic temperature to remove MEK and decrease water content, thereby obtaining the objective resorcinol-formalin resin aqueous solution having moderate flowability with a solid content of about 50%. This resorcinol-formalin resin aqueous solution having a solid content of about 50% is an MEK-modified resorcinol-formalin resin which does not contain inorganic salts and has reduced contents of a resorcinol monomer and a resorcinol pentanuclear nuclear body.

EXAMPLE 3

The MEK-modified resorcinol-formalin resin obtained in Example 2 was dissolved in tetrahydrofuran. Gel permeation chromatography analysis was conducted to measure the distribution of unreacted resorcinol to resorcinol pentanuclear or higher nuclear bodies. The results are shown in FIG. 1. Peak area ratios of the chromatograph obtained are shown below.

| | |
|---|---|
| Resorcinol | 6.5% |
| Resorcinol binuclear body | 13.4% |
| Resorcinol trinuclear body | 14.3% |
| Resorcinol tetranuclear body | 13.5% |
| Resorcinol penta- or higher nuclear body | 52.3% |

Gel permeation chromatography analysis conditions in this case are shown below.
Measurement device: HLC-8020, a product of Tosoh Corporation
Column: (G-2000)+(G-2000)+(G-4000)
Column temperature: 40° C.
Solvent: Tetrahydrofuran
Flow rate: 1 mil/min

COMPARATIVE EXAMPLE 1

270 kg of water, 170 kg of calcium chloride and 74 kg of resorcinol were placed in a 500-liter acid-resistant reaction tank, and were dissolved at 50° C. 30 kg of MEK and 0.9 kg of 35% hydrochloric acid were then placed in the reaction tank. While maintaining the reaction system at 50° C., 33 kg of 37% formalin was added dropwise over 30 minutes. After completion of the dropwise addition, stirring was conducted for 30 minutes to allow a liquid-liquid heterogeneous reaction to proceed. While maintaining the temperature of the reaction system, the resulting reaction mixture was allowed to stand to separate into two layers, and the aqueous layer (0) was taken out. The MEK layer (0) was diluted with 200 kg of MEK, and 100 kg of water was added. The reaction system was stirred for 30 minutes while maintaining the constant temperature. The mixture was allowed to stand to separate into two layers, and the aqueous layer (1) was taken out. The MEK layer (1) was diluted with 400 kg of MEK, and distillation was conducted at an azeotropic temperature of water and MEK to dehydrate. After cooling to room temperature, solid calcium chloride was removed by filtration to obtain an MEK solution containing an MEK-modified resorcinol-formalin resin.

COMPARATIVE EXAMPLE 2

The MEK solution of a resorcinol-formalin resin obtained in Comparative Example 1 was again placed in the reaction tank, 200 kg of water was added, 0.6 kg of 28% aqueous ammonia was added, and distillation was conducted at an azeotropic temperature to remove MEK and to reduce water content, thereby obtaining the objective resorcinol-formalin aqueous solution having moderate flowability with a solid content of about 50%. This resorcinot-formalin aqueous solution having the solid content of about 50% is an MEK-modified resorcinol-formalin resin having reduced contents of a resorcinol monomer and resorcinol pentanuclear or higher nuclear bodies.

COMPARATIVE EXAMPLE 3

Figure 2:
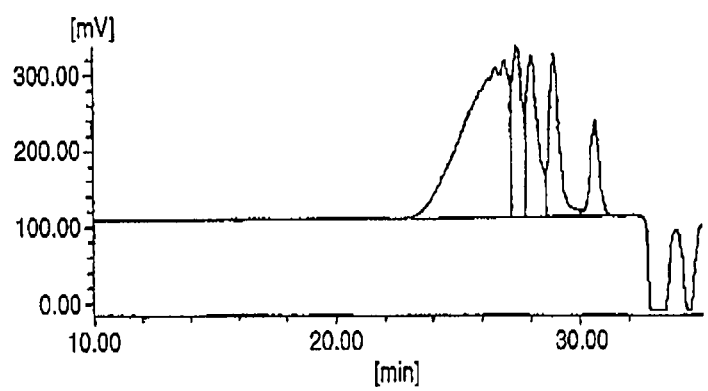
FIG. 2 is a gel permeation chromatograph chart of the MEK resorcinol-formalin resin aqueous solution obtained in Comparative Example 2.

The MEK-modified resorcinol-formalin resin obtained in Comparative Example 2 was dissolved in tetrahydrofuran, and gel permeation chromatography analysis was conducted to measure the distribution of unreacted resorcinol to resorcinol pentanuclear or higher nuclear bodies. The results are shown in FIG. 2. Furthermore, peak area ratios of the chromatogram obtained are shown below.

| | |
|---|---|
| Resorcinol | 6.6% |
| Resorcinol binuclear body | 13.3% |
| Resorcinol trinuclear body | 14.0% |
| Resorcinol tetranuclear body | 13.2% |
| Resorcinol penta- or higher nuclear body | 52.9% |

EXAMPLE 4

The method of distilling away methanol from the aqueous layer (0) obtained in the production steps of Example 1 was as follows.

After a liquid-liquid heterogeneous reaction between MEK and water is allowed to proceed, the resulting reaction mixture is then allowed to stand while maintaining the temperature of the reaction system, to thereby separate into two layers. The aqueous layer (0) is transferred into a distillation column (1,000 liters). 28% aqueous ammonia is added to this aqueous layer (0) to neutralize the pH of the aqueous solution to 7 to 8. Thereafter, methanol in the aqueous solution is distilled away by distillation method (liquid temperature: about 65 to 70° C.). The recovered methanol including methanol recovered from the aqueous layer (1), the aqueous layer (2), etc. is transferred into a mixing vessel. The recovered methanol can be reused mainly for washing facilities.

EXAMPLE 5

436 kg of the aqueous solution obtained in Example 4 in which the concentration of calcium chloride contained in the aqueous layer from which methanol had been removed was adjusted to 39% by mass, and 74 kg of resorcinol were placed in a 500-liter acid-resistant reaction tank, and were dissolved at 50° C. 30 kg of the recovered MEK and 0.9 kg of 35% hydrochloric acid were placed in the reaction tank. 33 kg of 37% formalin was added dropwise over 30 minutes while maintaining the reaction system at 50° C. and, after completion of the dropwise addition, stirring was conducted for 30 minutes to allow a liquid-liquid heterogeneous reaction to proceed. The resulting reaction mixture was allowed to stand while maintaining the temperature of the reaction system, to thereby separate into two layers, and the aqueous layer (0) was taken out. 100 kg of water was added to the MEK layer (0) to sufficiently wash with water. The mixture was allowed to stand to separate into two layers, and the aqueous layer (1) was taken out. This water washing operation was conducted at least one time to remove the aqueous layer (2). An MEK solution containing an MEK-modified resorcinol-formalin resin was obtained in the MEK layer (2).

EXAMPLE 6

The MEK solution of a resorcinol-formalin resin obtained in Example 5 was again placed in the reaction tank, 80 kg of water was added, 0.6 kg of 28% ammonia water was added, and distillation was conducted at an azeotropic temperature to remove MEK and to reduce water content, thereby obtaining the objective resorcinol-formalin aqueous solution having moderate flowability with a solid content of about 50%. This resorcinol-formalin aqueous solution having a solid content of about 50% is an MEK-modified resorcinol-formalin resin which does not contain an inorganic salt and has reduced contents of a resorcinol monomer and a resorcinol penta-nuclear nuclear body.

EXAMPLE 7

Figure 3:
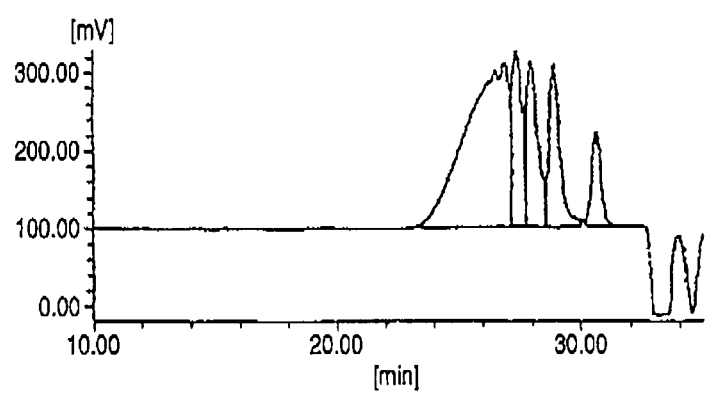
FIG. 3 is a gel permeation chromatograph chart of the MEK resorcinol-formalin resin aqueous solution obtained in Example 6.

The MEK-modified resorcinol-formalin resin obtained in Example 6 was dissolved in tetrahydrofuran, and gel permeation chromatography analysis was conducted to measure the distribution of unreacted resorcinol to resorcinol penta-nuclear or higher nuclear bodies. The results are shown in FIG. 3. Furthermore, peak area ratios of the chromatogram obtained are shown below.

| | |
|---|---|
| Resorcinol | 6.9% |
| Resorcinol binuclear body | 13.6% |
| Resorcinol trinuclear body | 14.2% |
| Resorcinol tetranuclear body | 13.2% |
| Resorcinol penta- or higher nuclear body | 52.1% |

When the peak area ratios of the chromatogram obtained with the MEK-modified resorcinol-formalin resin synthesized using the recovered raw materials (MEK and calcium chloride water) of Example 6 and the peak area ratios of the gel permeation chromatogram of the MEK-modified resorcinol-formalin resin (Example 2) synthesized without using the recovered raw materials are compared and investigated, no difference is recognized between these. Further, similar results have been obtained in other quality tests, and it was confirmed that use of the recovered raw materials does not have the problem on quality.

EXAMPLES

As a model experiment (1), an MEK-modified resorcinol-formalin resin was synthesized under the production conditions that the charging ratio is the same as in Example 1, and methanol content and MEK content in the aqueous layer (0), the aqueous layer (1), the aqueous layer (2) and the MEK layer (2), obtained by the post-treatment process after the reaction were quantitatively determined with GC (gas chromatography) method. The methanol content in the raw material formalin was 8.1 V/V %. The analysis results are shown in Table 2.

TABLE 2

| Sample No. | Sample | Methanol content (V/V %) | MEK content (V/V %) |
|---|---|---|---|
| 1 | Aqueous layer (0) | 0.36 | 0.11 |
| 2 | Aqueous layer (1) | 0.33 | 1.5 |
| 3 | Aqueous layer (2) | 0.17 | 2.3 |
| 4 | MEK layer (2) | 0.38 | — |

Furthermore, from the respective amount obtained, its specific gravity and the analysis results of Table 2, the amounts of methanol and MEK in each sample are shown in Table 3.

TABLE 3

| Sample No. | Sample name | Amount obtained (g) | Specific gravity | Methanol content (ml) | Methanol distribution ratio (%) | MEK content (ml) |
|---|---|---|---|---|---|---|
| 1 | Aqueous layer (0) | 888.1 | 1.325 | 2.41 | 54.8 | 0.74 |
| 2 | Aqueous layer (1) | 168.0 | 1.057 | 0.52 | 11.8 | 2.38 |
| 3 | Aqueous layer (2) | 276.2 | 1.012 | 0.46 | 10.5 | 6.28 |
| 4 | MEK layer (2) | 215.0 | 0.81 | 1.01 | 22.9 | — |
| — | Total | 1547.3 | — | 4.40 | 100.0 | — |
| 5 | Formalin (37%) | 66.0 | 1.08 | 4.95 | — | — |

Methanol content in each sample (No. 1 to No. 4) is shown in Table 3. This is a numerical value obtained by quantitatively determining the methanol content in each sample using the calibration curve described below, and from those results, a distribution ratio to each sample is roughly a numerical value shown in Table 3. This was the result as initially expected.

Methanol content and MEK content in each sample were quantitatively determined under the following GC conditions.

[GC Condition]
Model: Agilent Technologies 6890N, Autoinjector 7683ALS
Column: Molten silica HP-1, 0.25 mm diameter×30 m (film thickness 0.25 μm)
Detector: Hydrogen flame ionization detector
Hydrogen flow rate: 30 ml/min
Air flow rate; 400 ml/min
Column temperature: 60° C. (holding time 4 min), 50° C./min temperature rising, 160° C. (holding time 5 min)
Inlet temperature: 200° C., detector temperature: 220° C.
Carrier gas: Helium Column flow rate: 26 cm/sec (1.0 ml/min)
Split ratio: 20:1
Septum purge: 3 to 6 ml/min
Make-up gas: nitrogen, 25 ml/min
Injection volume: 1 μl
Analysis time: 4 min

[Preparation of Calibration Curves for Methanol and MEK]

The preparation method of a calibration curve is as follows.

(1) A calibration curve for methanol was prepared as follows. 5 ml of methanol was collected in a 100 ml measuring flask, and adjusted with water to prepare a 5% (V/V) solution. This solution was diluted with water to prepare solutions for calibration curve of 0.05, 0.1, 0.2 and 0.5% (V/V). Each solution was measured under the above-described GC conditions to prepare a calibration curve between peak height (Y) and concentration (X).

(2) Similarly, a calibration curve of MEK was prepared using 0.2, 0.5, 1.0 and 3.0% (V/V) solutions.

The respective regression equation of the calibration curve is as follows.

[Calibration Curves of Methanol and MEK]

(1) Methanol

Regression equation: Y=694.5622X−1.5038 (correlation coefficient r=0.9991)

(2) MEK

Regression equation: Y=2052.7238X+9.2004 (correlation coefficient r=0.9998)

As a model experiment (2), to verify the influence of the amount of methanol contained in a reaction liquid, reaction was conducted by adding a constant amount of methanol under the production condition that the charged ratio is the same as in Example 1. The respective MEK-modified resorcinol-formalin resin obtained was dissolved in tetrahydrofuran, and gel permeation chromatography analysis was conducted under the analysis conditions described before to measure the distribution of unreacted resorcinol (monomer) to resorcinol pentanuclear or higher nuclear bodies. Further, peak area % (PA %) of the chromatogram obtained is shown in Table 4.

TABLE 4

| Sample No. | Methanol added* (%) | GPC measurement (PA %) | | | | | Remarks |
|---|---|---|---|---|---|---|---|
| | | Monomer | Binuclear body | Trinuclear body | Tetranuclear body | Penta- or higher nuclear body | |
| 1 | 0 | 4.5 | 18.1 | 17.0 | 13.5 | 46.9 | Blank |
| 2 | 5 | 6.3 | 13.0 | 13.9 | 12.8 | 54.0 | |
| 3 | 10 | 7.1 | 11.5 | 13.4 | 12.5 | 55.4 | |
| 4 | 20 | 6.0 | 9.3 | 10.6 | 9.5 | 64.7 | |

*Amount of methanol added is expressed by W/V % with respect to calcium chloride aqueous solution.

The tendency was recognized from the result of Table 4 that when the amount of methanol in a reaction liquid is increased, a part of binuclear bodies to tetranuclear bodies in the RF resin transfers into an aqueous layer, resulting in an increase of pentanuclear or higher nuclear bodies. From this analysis result, it was proven that when methanol is present in a reaction liquid in an amount of 10% or more, quality deviates from the specified value (proportion of pentanuclear or higher nuclear bodies in RF resin).

Although the present invention has been described in detail and by reference to the specific embodiments, it is apparent to one skilled in the art that various modifications or changes can be made without departing the spirit and scope of the present invention.

Industrial Applicability

The present invention relates to a process for producing an MEK-modified resorcinol-formalin resin, in which recovery and reuse of the specific raw materials (calcium chloride and MEK) and methanol contained in formalin are carried out in parallel, and can be applied to the similar production of a polymer using formalin by stabilizing quality of products, reducing costs and reducing environmental loads.

The invention claimed is:

1. A process for producing an MEK-modified resorcinol-formalin resin, the process comprising:

(a) mixing, in any order, and dissolving:
   100 parts by mass of water;
   20 to 40 parts by mass of resorcinol (A), relative to the 100 parts by mass of the water; and
   20 to 80 parts by mass of calcium chloride (B), relative to the 100 parts by mass of the water; then (b) adding, in any order:
   10 to 100 parts by mass of methyl ethyl ketone (C), relative to 100 parts by mass of the resorcinol (A), followed by stirring to form a two-phase mixture which does not contain residual solid content; and
   hydrochloric acid (D) as a catalyst; then (c) adding dropwise 1 to 40% formalin (E) under stirring in such an amount that results in a formaldehyde/resorcinol molar ratio of 0.3 to 0.7, thereby allowing a liquid-liquid heterogeneous mixture to react; then (d) allowing the liquid-liquid heterogeneous mixture to stand and separate into two layers, and then removing an aqueous layer (0); then (e) adding water to a methyl ethyl ketone layer (0), which is a reaction product layer that remains after removing the aqueous layer (0), in an amount of from an equivalent amount to 5 times the amount of the reaction product layer, to conduct a water washing; then (f) allowing a resulting mixture (1) to stand and separate into two layers, and then removing an aqueous layer (1), thereby obtaining a methyl ethyl ketone layer (1); then (g) further conducting at least one additional water washing of the methyl ethyl ketone layer (1) to remove an aqueous layer (2), thereby obtaining a methyl ethyl ketone layer (2) comprising an MEK-modified resorcinol-formalin resin; then (h) adding water in an amount of from 2.5 to 5 times by mass to the methyl ethyl ketone layer (2), and then adding 1 to 30% aqueous ammonia to form a resulting mixture (2) comprising an aqueous resin solution (1); and then (i) distilling the resulting mixture (2), thereby removing the methyl ethyl ketone (C), to obtain an aqueous resin solution (2) having:

an MEK-modified resorcinol-formalin resin concentration of from 30 to 80%;
moderate flowability with a pH of 6 to 10;
a calcium chloride (B) concentration of 100 ppm or less;
a peak area corresponding to a resorcinol monomer of from 3 to 9% to an entire peak area obtained by gel permeation chromatography analysis; and
a peak area corresponding to resorcinol pentanuclear or higher nuclear bodies of from 30 to 55% to the entire peak,
wherein recovery and reuse of specific raw materials comprising water, the calcium chloride (B), and the methyl ethyl ketone (C), in the production steps, and recovery and reuse of methanol contained in the formalin (E), are carried out in parallel.

2. The process of claim 1, wherein the recovery and reuse of methanol is carried out in parallel by obtaining the methanol from the aqueous layer (0), the aqueous layer (1), the aqueous layer (2) and the methyl ethyl ketone layer (2) by reduced pressure-distillation, followed by rectification.

3. The process of claim 1, wherein the reuse of the calcium chloride (B) and water is carried out in parallel by removing the methanol from the aqueous layer (0) to produce an aqueous layer containing calcium chloride, and then adjusting a concentration of calcium chloride (B) in the aqueous layer containing calcium chloride to approximately the concentration of calcium chloride (B) after the mixing (a), to form a recycled aqueous solution.

4. The process of claim 1, wherein the recovery and reuse of the methyl ethyl ketone (C) is carried out in parallel by obtaining methyl ethyl ketone from the methyl ethyl ketone layer (2), the aqueous layer (1), and the aqueous layer (2) by simple distillation, followed by rectification.

5. The process of claim 3 further comprising:
(a') mixing, in any order, and dissolving:
the recycled aqueous solution, comprising 100 parts by mass of water and 20 to 80 parts by mass of calcium chloride (B) relative to the 100 parts by mass of the water; and
20 to 40 parts by mass of resorcinol (A'), relative to the 100 parts by mass of the water; then
(b') adding, in any order:
10 to 100 parts by mass of methyl ethyl ketone (C'), relative to 100 parts by mass of the resorcinol (A'), followed by stirring to form a two-phase mixture which does not contain residual solid content; and
hydrochloric acid (D') as a catalyst; then
(c') adding dropwise 1 to 40% formalin (E') under stirring in such an amount that results in a formaldehyde/resorcinol molar ratio of 0.3 to 0.7, thereby allowing a liquid-liquid heterogeneous mixture to react; then
(d') allowing the liquid-liquid heterogeneous mixture to stand and separate into two layers, and then removing an aqueous layer (0'); then
(e') adding water to a methyl ethyl ketone layer (0'), which is a reaction product layer that remains after removing the aqueous layer (0'), in an amount of from an equivalent amount to 5 times the amount of the reaction product layer, to conduct a water washing; then
(f) allowing a resulting mixture (1') to stand and separate into two layers, and then removing an aqueous layer (1'), thereby obtaining a methyl ethyl ketone layer (1'); then
(g') further conducting at least one additional water washing of the methyl ethyl ketone layer (1') to remove an aqueous layer (2'), thereby obtaining a methyl ethyl ketone layer (2') comprising an MEK-modified resorcinol-formalin resin (2); then
(h') adding water in an amount of from 2.5 to 5 times by mass to the methyl ethyl ketone layer (2'), and then adding 1 to 30% aqueous ammonia to form a resulting mixture (2') comprising an aqueous resin solution (1'); and then
(i') distilling the resulting mixture (2'), thereby removing the methyl ethyl ketone (C'),
to obtain an aqueous resin solution (2') having:
an MEK-modified resorcinol-formalin resin concentration of from 30 to 80%;
moderate flowability with a pH of 6 to 10;
a calcium chloride (B) concentration of 100 ppm or less;
a peak area corresponding to a resorcinol monomer of from 3 to 9% to an entire peak area obtained by gel permeation chromatography analysis; and
a peak area corresponding to resorcinol pentanuclear or higher nuclear bodies of from 30 to 55% to the entire peak,
wherein recovery and reuse of specific raw materials comprising water, the calcium chloride (B), and the methyl ethyl ketone (C'), in the production steps, and recovery and reuse of methanol contained in the formalin (E'), are carried out in parallel.

6. A process for producing an MEK-modified resorcinol-formalin resin, the process comprising:
(a) mixing, in any order, and dissolving:
100 parts by mass of water;
20 to 40 parts by mass of resorcinol (A), relative to the 100 parts by mass of the water; and
20 to 80 parts by mass of calcium chloride (B), relative to the 100 parts by mass of the water; then
(b) adding, in any order:
10 to 100 parts by mass of methyl ethyl ketone (C), relative to 100 parts by mass of the resorcinol (A), followed by stirring to form a two-phase mixture which does not contain residual solid content; and
hydrochloric acid (D) as a catalyst; then
(c) adding dropwise 1 to 40% formalin (E) under stirring in such an amount that results in a formaldehyde/resorcinol molar ratio of 0.3 to 0.7, thereby allowing a liquid-liquid heterogeneous mixture to react; then
(d) allowing the liquid-liquid heterogeneous mixture to stand and separate into two layers, and then removing an aqueous layer (0); then
(e) adding water to a methyl ethyl ketone layer (0), which is a reaction product layer that remains after removing the aqueous layer (0), in an amount of from an equivalent amount to 5 times the amount of the reaction product layer, to conduct a water washing; then
(f) allowing a resulting mixture (1) to stand and into two layers, and then removing an aqueous layer (1), thereby obtaining a methyl ethyl ketone layer (1); then
(g) further conducting at least one additional water washing of the methyl ethyl ketone layer (1) to remove an aqueous layer (2), thereby obtaining a methyl ethyl ketone layer (2) comprising an MEK-modified resorcinol-formalin resin; then
(h) adding water in an amount of from 2.5 to 5 times by mass to the methyl ethyl ketone layer (2), and then adding 1 to 30% aqueous ammonia to form a resulting mixture (2) comprising an aqueous resin solution (1); and then
(i) distilling the resulting mixture (2), thereby removing the methyl ethyl ketone (C),
to obtain an aqueous resin solution (2) having:
an MEK-modified resorcinol-formalin resin concentration of from 30 to 80%;

moderate flowability with a pH of 6 to 10;
a calcium chloride (B) concentration of 100 ppm or less;
a peak area corresponding to a resorcinol monomer of from 3 to 9% to an entire peak area obtained by gel permeation chromatography analysis; and
a peak area corresponding to resorcinol pentanuclear or higher nuclear bodies of from 30 to 55% to the entire peak,
wherein recovery and reuse of specific raw materials comprising the calcium chloride (B) and the methyl ethyl ketone (C), in the production steps, and recovery and reuse of methanol contained in the formalin (E), are carried out in parallel.

* * * * *